US00H002100H

(19) United States

(12) Statutory Invention Registration (10) Reg. No.: US H2100 H

Hansen et al. (43) Published: Apr. 6, 2004

(54) LOW STRESS RELAXATION ADHESIVE HAVING HIGH MOLECULAR WEIGHT ENDBLOCK COPOLYMER

(75) Inventors: David Romme Hansen, Houston, TX (US); Lydia Ann Salazar, Katy, TX (US)

(73) Assignee: Kraton Polymers LLC, Houston, TX (US)

(21) Appl. No.: 08/890,134

(22) Filed: Jul. 9, 1997

Related U.S. Application Data

(63) Continuation of application No. 08/622,487, filed on Mar. 26, 1996, now abandoned.

(51) Int. Cl.[7] ..... C08L 53/00

(52) U.S. Cl. ..... 524/505

(58) Field of Search ..... 524/505

(56) References Cited

U.S. PATENT DOCUMENTS

| | | | | |
|---|---|---|---|---|
| 3,231,635 A | | 1/1966 | Holden et al. | 260/880 |
| 3,577,398 A | | 5/1971 | Pace et al. | 260/85.3 |
| RE27,145 E | | 6/1971 | Jones | 260/880 |
| 3,797,495 A | | 3/1974 | Schmidt | 128/287 |
| 4,360,568 A | | 11/1982 | Allison, III | 428/411 |
| 4,394,915 A | | 7/1983 | Nelson | 215/12 R |
| 4,419,494 A | * | 12/1983 | Puletti et al. | 525/95 |
| 4,719,261 A | | 1/1988 | Bunnelle et al. | 525/97 |
| 4,789,699 A | | 12/1988 | Kieffer et al. | 524/271 |
| 4,801,485 A | | 1/1989 | Sallee et al. | 428/198 |
| 4,835,200 A | | 5/1989 | St. Clair | 524/100 |
| 4,855,335 A | | 8/1989 | Neperud | 523/111 |
| 5,093,422 A | | 3/1992 | Himes | 525/98 |
| 5,149,741 A | | 9/1992 | Alper et al. | 525/95 |
| 5,169,706 A | | 12/1992 | Collier, IV et al. | 428/152 |
| 5,194,530 A | | 3/1993 | Stevens et al. | 526/82 |
| 5,342,858 A | | 8/1994 | Litchholt et al. | 521/98 |
| H1387 H | | 12/1994 | Hansen et al. | 525/92 |

FOREIGN PATENT DOCUMENTS

| | | | |
|---|---|---|---|
| EP | 0525251 A1 | 12/1991 | A61L/15/58 |
| EP | 0557573 A2 | 7/1992 | C08J/5/18 |
| EP | 0603497 A1 | 6/1994 | D04H/13/00 |
| WO | 94/01507 | 1/1994 | C09J/109/06 |

* cited by examiner

*Primary Examiner*—Michael J. Carone
*Assistant Examiner*—Aileen B. Felton

(57) ABSTRACT

An adhesive formulation is provided comprising an elastomeric block copolymer having a midblock segment derived from polymerized diene monomer and at least two endblock segments derived from polymerized monovinyl substituted aromatic compound monomer, a midblock compatible tackifier, a midblock compatible oil, and endblock compatible resin and an antioxidant. The block copolymer can be either an unhydrogenated polymer having terminal endblocks with a molecular weight within the range of 13,000 to 30,000 or it can be a hydrogenated copolymer having terminal endblocks with a molecular weight of 11,000 to 20,000. The presence of roughly high molecular weight endblock segments results in an adhesive composition having superior (lower) stress relaxation and set.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW STRESS RELAXATION ADHESIVE HAVING HIGH MOLECULAR WEIGHT ENDBLOCK COPOLYMER

This is a continuation of application Ser. No. 08/622,487, filed Mar. 26, 1996 now abandoned.

BACKGROUND OF THE INVENTION

This invention relates to elastomer-based adhesive compositions.

The use of adhesives and sealants has been referred to throughout virtually all of recorded history. Sealants and adhesives have taken on even greater significance as society has become more industrialized. Natural rubber has long been a component of such compositions and still is. However, the advent of the synthetic polymer industry provided a variety of new sources of elastomeric components for such compositions. This has resulted in a high level of sophistication in the synthetic polymer industry thus allowing the tailoring of new polymers with specific characteristics. The ability to tailor polymers is especially great in that area known as "living" polymers, where different monomers and coupling agents can be sequentially added to give many different configurations. For instance, an alkenyl arene such as styrene can be introduced into a polymerization zone to form a resinous aromatic block A (Step I polymerization), thereafter a conjugated diene such as isoprene can be added to give an elastomeric block B followed by coupling with a difunctional coupling agent, X, to give an ABXBA structure (two AB arms) which is generally depicted as A-B-A. Thus, the polymerized styrene units become the endblocks and the polymerized diene units the midblock.

A similar high level of sophistication has developed in the adhesive industry as a result of intensive research that has gone on in the past several decades. For instance, it is known to use an additive which is compatible with the elastomeric midblock portion of a block copolymer and a separate additive which is compatible with the resinous endblock portion. These can be used alone or in combination with an extender oil. It has sometimes been observed that block copolymers of styrene and either butadiene or isoprene perform better in adhesive formulations at higher styrene levels in the polymer. Thus, it has been suggested in the art to use copolymers wherein 25 to 50 wt % of the copolymer is derived from styrene and the remainder from the diene. Others have suggested 16 to 30 wt % styrene content. However, adhesive and elastic performance can vary dramatically depending on the type of block copolymer that is used.

SUMMARY OF THE INVENTION

It is an object of this invention to provide an adhesive composition which exhibits improved, i.e., lower set or lower stress relaxation; and It is a further object of this invention to provide an improved method of formulating an adhesive composition.

In accordance with this invention, an adhesive composition is provided comprising an elastomeric block copolymer having relatively large aromatic resinous endblocks, a midblock compatible resin and oil, and optionally, an endblock compatible resin.

DESCRIPTION OF THE PREFERRED EMBODIMENTS

It has been surprisingly discovered that it is the size of the aromatic resinous endblocks, not the total amount of resinous component which is significant. It has further been found that elastomeric block copolymers made using large aromatic endblocks when formulated with high levels of midblock compatible resin and oil give an adhesive exhibiting superior stress relaxation and set characteristics. Preferably, the composition also contains an endblock compatible resin, most preferably a high Tg endblock compatible resin.

The elastomeric polymer component of this invention is made utilizing an organic alkali metal catalyst such as secondary butyllithium, thus producing living polymer chains. As noted hereinabove, this technique is well known in the art. It is essential to the invention that the copolymers have terminal aromatic resinous blocks made of polymerized monovinyl aromatic monomer and an elastomeric midblock portion made of polymerized conjugated diene monomer. Generally the polymer will be what is typically referred to as an A-B-A or $(A\text{-}B)_n$-X (multi-arm) polymer wherein an A designates the polymerized monovinyl aromatic component, B designates the polymerized diene component, and X denotes the coupling agent. Some diblock can be tolerated, but it is preferred to have at least 60 percent triblock or multi-arm, i.e. at least two or more endblocks. Ideally there is less than 10 percent diblock and the compositions can have essentially no diblock.

These can be made by sequential polymerization wherein monovinyl aromatic monomer is first introduced to produce a resinous block followed by the introduction of the conjugated diene monomer to produce the rubbery midblock followed by additional monovinyl aromatic compound to produce the other terminal resinous block. This is disclosed in Holden, U.S. Pat. No. 3,231,635 (Jan. 25, 1966), the disclosure of which is hereby incorporated by reference. Alternatively, after polymerization of the first resinous block and the polymerization of one half of the desired amount of diene block, the resulting A-B component can be coupled with a difunctional coupling agent to give the final A-B-A polymer. This is disclosed in Stevens et al, U.S. Pat. No. 5,194,530 (Mar. 16, 1993) the disclosure of which is hereby incorporated by reference. It is also within the scope of this invention to utilize block polymers having radial or star configuration wherein the coupling agent has more than two reactive sites as is well known in the art. Preferably the unhydrogenated polymers are made by coupling with a difunctional coupling agent and the ones to be hydrogenated are made by the sequential polymerization.

It is also possible to utilize an organic dilithium initiator which allows introduction of the monomer in only two batches. That is, the conjugated diene is initially added to give the midblock portion and thereafter the monovinyl arene added to give the endblock portions, this technique also being well known in the art.

Whatever the method of formation, the essential feature for this invention is that the individual aromatic terminal resinous blocks have a relatively high molecular weight as described in more detail hereinafter.

As previously noted, it has been surprisingly discovered that it is the size of each aromatic A block, not the total amount of monovinyl aromatic component which is significant. For instance, a 15,500 styrene endblock coupled polymer at 148,000 MW would have only 21 wt % monovinyl aromatic content. This is outside the range of some of the latest prior art teachings as to the proper amount of resinous component. However, such a material in fact is an excellent component for adhesive compositions. Conversely, a 10,000 aromatic A block coupled polymer at 80,000 total MW would have 25 wt % resinous component which the art would teach as ideal, but in fact, would give an adhesive with poor stress relaxation properties.

These numbers are calculated as follows: initial monovinyl arene introduced sufficient to give a 15,500 MW endblock followed by diene monomer sufficient to give 58,500 MW blocks followed by coupling to give a rubbery midblock of 117,000 (the two 58,500 blocks joined together) and a total of 31,000 resinous components (the sum of the two 15,500 endblocks). Thus 31,000 divided by 148,000 equals 21%. A 10,000 aromatic endblock followed by polymerization of a 30,000 MW diene component followed by coupling would thus give 20,000 total resinous component and 60,000 total rubbery component for a 25% resinous content of the total polymer (20,000 divided by 80,000).

Suitable monomers for the aromatic resinous component block are monovinyl aromatic compounds having 8 to 20 carbon atoms as exemplified by styrene and styrene homologs such as α-methylstyrene and para-methylstyrene. Styrene and α-methylstyrene are particularly preferred with styrene being most preferred.

Suitable monomers for the rubbery midblock component are conjugated alkadienes having 4 to 8 carbon atoms. Illustrative of such conjugated alkadienes are 1,3-butadiene (butadiene), 2-methyl-1,3-butadiene (isoprene), 1-3-pentadiene (piperylene), 1,3-octadiene, and 2-methyl-1,3-pentadiene. Preferred conjugated alkadienes are butadiene and isoprene with isoprene being most preferred.

While any technique to produce elastomeric block copolymers with endblock portions having the molecular weights set out herein can be utilized, the preferred method is to utilize secondary butyllithium in a cyclohexene solvent. Sufficient styrene monomer is introduced to give the desired aromatic A block molecular weight with polymerization being effected in a time ranging from 1 minute up to 6 hours, preferably about 10 minutes to 2 hours. The polymerization temperature is not critical and will generally be in the range of 15 to 150° C., preferably in the range of from about 40 to about 90° C. Thereafter sufficient diene, preferably isoprene, is introduced and polymerization carried out under the same conditions after which the mixture is combined with a coupling agent, such as tertiary butyl methacrylate, epoxidized polybutadiene, diglycidyl epoxy, dibromomethane, diethyl adipate, dichlorosilane, dimethoxysilane, tetramethoxysilane, trimethoxysilane, tetrachlorosilane, divinylbenzene, dimethyl adipate, or analogous coupling agents.

Various materials are known to be detrimental to the lithium metal-initiated polymerization. Particularly, the presence of carbon dioxide, oxygen, water and alcohol should be avoided during an organo lithium-initiated polymerization as well as during the coupling. Subsequent to coupling or final styrene addition in a sequential ABA polymerization, such materials may introduced for the purpose of deactivating any remaining active lithium sites.

There are significant differences between the preferred formulations for unhydrogenated as opposed to hydrogenated polymer. Accordingly, the invention is separately described for the two different polymers.

Unhydrogenated

As to the critical endblock resinous segments, the molecular weight is within the range of 13,000 to 30,000, preferably 14,000 to 20,000, most preferably 15,000 to 16,000. Again, this is the molecular weight of each endblock segment and thus for the preferred diblock coupled A-B-A compositions, the weight of the resinous component is twice that of the each A block composition.

The molecular weight of a total linear polymer can vary from 74,000 to 400,000, preferably 74,000 to 267,000, most preferably from 86,000 to 213,000. The molecular weight range is slightly higher for an unhydrogenated as opposed to hydrogenated polymer because the isoprene or butadiene rubbery block is lower in viscosity than is the hydrogenated (i.e., ethylene/propylene or ethylene/butene) rubbery block.

Viewed another way, polymer is selected so that with the additive package utilized the final adhesive melt viscosity (Brookfield at 177° C.) is <500,000 cps, preferably 100,000 cp or less.

Reference herein to the molecular weight of an "arm" refers to the molecular weight from the coupling site to the end or, in the case of sequentially polymerized triblock polymers, from the middle to the end. Arm molecular weights for polymers can vary depending on the parameters set out herein but include values of 43,000 to 106,000 for unhydrogenated polymer.

As to the weight percent styrene based on the total polymer, the following considerations apply. First as emphasized hereinabove, it is the molecular weight of each endblock, not the total resinous component percentage that is significant. Nonetheless, the invention relates to elastomeric adhesive compositions made utilizing an elastomeric polymer. Accordingly, the total resinous content must be sufficiently low that the polymer is an elastomer. Hence, the monovinyl aromatic compound content generally will range from 10 to 50 wt % based on the total weight of the polymer. For pressure sensitive adhesives which are the main focus of this invention, the aromatic resinous component is preferably within the range of 15 to 35 wt %, and more preferably about 20 to 24 wt %. Above 30 wt % resinous component, the material is still sticky but generally not as good a pressure sensitive adhesive.

It is essential that the compositions have a midblock compatible resin and oil. The type of resins which are midblock compatible are known in the art and are described for instance, in Allison U.S. Pat. No. 4,360,568 (Nov. 23, 1982) the disclosure of which is herein incorporated by reference. These types of material go exclusively or almost exclusively into the rubbery midblock section, not just because it is rubbery but also because it is a non-aromatic component. Hence, these materials are aliphatic compounds which is meant to include both pure hydrocarbons and mixtures. Hence, the midblock compatible resin may be a straight chain hydrocarbon such as a polymerized olefin sold under a tradename such as Wingtack® 95 (Wingtack® 95 is prepared by the cationic polymerization of 60% piperylene, 10% isoprene, 5% cyclopentadiene, 15% 2-methyl-2-butene and about 10% dimer, as taught in U.S. Pat. No. 3,577,398) and Super StaTac®. Others include polydipentenes sold under the tradename Zonarez® 7115 and polyterpenes. Other suitable midblock compatible resins can be produced by hydrogenating an aromatic component so as to remove not only any vinyl or internal straight chain unsaturation but also to remove most of the aromatic unsaturation. For instance, a particularly preferred material is sold under the tradename Regalrez by Hercules.

Unsuitable for either the midblock or endblock component are materials which go into both the aromatic and aliphatic portions of the elastomer. For instance, unhydrogenated styrenated terpenes and unhydrogenated rosin esters are unsuitable because they have compatibility with the aromatic portion of the molecule and compatibility with the aliphatic elastomeric midblock.

The oil must be compatible with the midblock segment of the elastomer and not tend to go into the aromatic resinous endblock portion. Suitable oils include hydrogenated napthenics. These are free or virtually free of aromatic unsaturation. They may have rings but any aromatic unsaturated bonds has been rendered saturated by virtue of hydrogenation. A particularly suitable material is Tufflo® 6056 sold by Witco. It is a hydrogenated napthenic. Shellflex® 371 would also be suitable.

Suitable endblock resins are those compatible with the resinous endblock segments of the elastomer. Examples of resins useful as endblock compatible components for the formulations of this invention include: AMOCO® 18 series resins, which are composed of α-methylstyrene (AMOCO), Kristalex® series resins, which are composed of α-methylstyrene (HERCULES), PICOTEX® Series resins, which are composed of α-methylstyrene and vinyl toluene (HERCULES), NEVCHEM® (NEVILLE) and PICCO 6000 (HERCULES) series resins, which are composed of aromatic hydrocarbons, CUMAR® series resins and CUMAR LX-509 (NEVILLE), which are composed of coumarone-indene, and ENDEX® 155 being especially preferred. ENDEX® 155 is preferred because of its high glass transition temperature, Tg which is 100. It is particularly desirable that the endblock compatible resin have a glass transition temperature and softening point which are approximately equal to or higher than the glass transition and softening point of the vinylarene resinous endblock component which has a Tg of 95° C. Hence, endblock compatible resins having a Tg above 90 are preferred with those having a Tg of 100 to 210 being especially preferred. Generally, coumarone-indene and vinylarene resins tend to have higher Tg values. Another type of suitable high Tg endblock compatible resins is polyphenylene oxide (PPO) resins which have a Tg of 165–210° C. A key is not plasticizing the resinous domains by using low Tg resinous block compatible additives. The endblocks should be large aromatic endblocks and the benefit of this must not be taken away with low Tg endblock resins or resins which go into both the endblock and the midblock. Indeed, by using the high Tg endblock resins such as Endex® 155 or the polyphenylene oxides, the styrene domains can actually be enhanced by the endblock resin.

The stabilizer can be any conventional stabilizer or stabilizer system and frequently is simply an antioxidant such as a hindered phenol. Particularly preferred is Irganox 1010 which is tetrakis[methylene (3,5-di-t-butyl-4-hydroxyhydrocinnamate)] methane. Suitable stabilizers are shown in Alper et al, U.S. Pat. No. 5,149,741 (Sep. 22, 1992), and St. Clair, U.S. Pat. No. 4,835,200 (May 30, 1989), the disclosures of which are herein incorporated by reference. It is noted however that the more volatile materials such as 2,6- di-tert-butylphenol are less preferred because of the volatility. Also, thiosynergists are less preferred because of possible odor problems.

Since the stabilizer acts to stabilize all of the ingredients that are subject to degradation, it is convenient to think of the composition in terms of A) a base composition comprising
  (i) the elastomeric block copolymer,
  (ii) the midblock compatible resin, oil and endblock compatible resin if present; and B) the stabilizer.

The base composition comprises 15 to 35 wt % of the unhydrogenated elastomeric block copolymer and 85 to 65 wt % of the ingredients comprising a midblock compatible resin, oil and optionally, an endblock compatible resin. More preferably, the block copolymer is present in an amount within the range of 20 to 30 wt %, most preferably 25 to 30 wt % with the other ingredients being present in an amount with the range of 80 to 70 wt %, more preferably 75 to 70 wt % respectively. The stabilizer then is present in an amount within the range of 0.01 to 5, preferably 0.5 to 1 wt % based on the weight of the base composition. Of course the adhesive composition comprising the base composition and the stabilizer can further contain conventional ingredients which do not affect its elastomeric adhesive properties significantly such as pigments, fragrances, and other ingredients of adhesives.

Further, with regard to the composition of the (ii) portion of the base composition, that is the midblock compatible resin, oil and optionally endblock compatible resin, the ingredients are present as follows. There is always a midblock compatible resin and oil with the midblock compatible resin being present in an amount greater than the amount of oil. Generally, a ratio of the midblock compatible resin:oil is within the range of 1.5:1 to 3.5:1, preferably 2:1 to 3:1.

In the preferred embodiments where an endblock compatible resin is also a part of component (ii), the endblock compatible resin is present in an amount within the range of 20 to 80 parts by weight, preferably 30 to 50 parts by weight per 100 parts by weight of the elastomeric block copolymer. Since component (ii) is a three component entity in this instance, the amount of midblock compatible resin and oil would be less but the ratio would still be within the ranges set out hereinabove. Component (ii) is sometimes referred to herein as a tackifier composition since the midblock compatible resin acts as a tackifier and in hot melt applications the endblock compatible resin does to although it does not strictly function as a tackifier in pressure sensitive adhesives.

Relative to the elastomeric block copolymer, the midblock compatible resin is generally present in an amount within the range of 120–450, preferably 150–300 parts by weight per 100 parts by weight of the elastomeric block copolymer. The oil, relative to the elastomeric block copolymer is present in an amount within the range of 40–225, preferably 45–150 parts by weight per 100 parts by weight of the elastomeric block copolymer. It is desired to keep the final Tg of the rubber phase below −5° C. Hence, this provides further guidance as to the amount (within the ranges set out) of the midblock compatible resin and oils to use for optimum results. Also at higher molecular weights more oil is required to maintain a suitable viscosity.

Hydrogenated Elastomeric Block Copolymer

Hydrogenation of elastomeric block copolymers is known in the art as shown by Jones, Reissue U.S. Pat. No. 27,145 (Jun. 22, 1971), the disclosure of which is hereby incorporated by reference. Such copolymers are commercially available from Shell Chemical Company under the designation KRATON® G Rubber. The hydrogenation is carried out so as to hydrogenate the remaining unsaturation in the polymerized diene block but not to hydrogenate any significant amount of the aromatic unsaturation. Generally, the polymerized diene unsaturation is reduced to less than 10%, preferably less than 5% of its original value while less than 50%, preferably less than 25%, more preferably less than 10% of the aromatic unsaturation is removed, i.e., preferably at least 75%, preferably 90% or more of the aromatic unsaturation remains.

The hydrogenation improves the stability of the composition. It also has the effect of making the copolymer have a higher viscosity at any given molecular weight. Accordingly, the molecular weight ranges for the hydrogenated polymers are slightly lower than those for the unhydrogenated in order to stay within the viscosity parameters which are the same for the adhesives made with the hydrogenated as for the adhesives made with the unhydrogenated component. Thus, the molecular weight will range from 70,000 to 170,000, more preferably from 80,000 to 120,000.

The polymerized monovinyl aromatic component content of the elastomer is within the same range as that set out for the unhydrogenated.

The molecular weight of the aromatic A endblocks (Step I when made using difunctional coupling agents) is within the range of 11,000 to 20,000, preferably 12,000 to 20,000, most preferably 13,000 to 17,000. Generally, these polymers are made by sequential polymerization as opposed to coupling. Thus, each monovinyl aromatic monomer addition is sufficient to give the indicated molecular weight. While the individual endblocks would not have to be of the same molecular weight, they generally are about the same and will always be within the ranges just set out. Thus, the endblock segments must be comparatively large, but can be slightly smaller than those required in the unhydrogenated polymer because hydrogenation gives better phase separation between the rubbery diene portion and the resinous monovinyl aromatic portion, thus giving stronger resinous segments. Stated another way, it makes the rubber section more different from the resinous section. This results in less creep and less stress relaxation. This can also be viewed from the point of view of solubility parameters which are as follows.

| | |
|---|---|
| Styrene | 9.1 |
| Butadiene | 8.4 |
| Isoprene | 8.1 |
| Ethylene Propylene | 7.9 |

Thus, as it can be seen that there is more difference between ethylene propylene (hydrogenated polymerized isoprene) and styrene than there is between isoprene and styrene. This greater difference between the rubbery phase and the resinous phase gives stronger styrene domains and translates into less creep and better (lower) set and stress relaxation.

Reference herein to the molecular weight of an "arm" refers to the molecular weight from the coupling site to the end or, in the case of sequentially polymerized triblock polymers, from the middle to the end. Arm weights for polymers can vary based on the parameters set out herein but include values of 30,000 to 60,000 for hydrogenated polymer.

The scope of the applicable midblock compatible resins, oil, endblock compatible resins and antioxidants is the same as for the unhydrogenated polymer. Similarly, the ratio of midblock compatible polymer to oil and the amount of stabilizer is the same as for unhydrogenated polymer.

The ratio of ingredients in the base composition varies however. The base composition is made up of 12 to 33 wt %, preferably 15 to 20 wt % of the elastomeric block copolymer and 88 to 67 wt %, preferably 85 to 80 wt % of the ingredients comprising midblock compatible resin, oil and optionally endblock compatible resin.

The midblock compatible resin and oil can also be viewed in terms of their relation to the amount of elastomeric block copolymer. Viewed in this way, the midblock compatible resin is present in an amount within the range of 140 to 600 parts by weight, preferably 250 to 500 parts by weight per 100 parts by weight of the elastomeric block copolymer. The oil is present in an amount within the range of 50 to 300, preferably 50 to 200, more preferably 125 parts by weight to 200 parts by weight per 100 parts by weight of the elastomeric block copolymer.

When endblock compatible resin is present it is present in an amount within the range of a finite amount up to 80 parts by weight per 100 parts by weight of the elastomeric block copolymer, preferably 20 to 80, and more preferably 25 to 40 parts by weight per 100 parts by weight of the elastomeric block copolymer.

Definitions

By "elastomeric copolymer" is meant a polymer which, when formed into an article, can be extended at least 60%, and thereafter will recover at least 55% of the extension. That is, a 100 cm tensile specimen can be extended to 160 cm and, on release and stress, will return to no more than 127 cm in length.

Molecular weights of linear block copolymer are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodispersed and it is both convenient and adequately descriptive to report the "peak" molecular weight of the narrow molecular weight distribution observed. Hence, this is what is meant with regard to references herein to molecular weight of linear polymers. This is also what is meant by the references herein to the molecular weight of the aromatic resinous A block. Since styrene is used to calibrate, this directly gives the absolute molecular weight of styrene endblocks. From this and the known percent styrene, the absolute molecular weight of the midblock is calculated. That is, an aliquot is removed after the first step of the polymerization, terminated to deactivate the initiator and the molecular weight measured.

Measurement of the true molecular weight of final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good analytical method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly onto the light scattering cell. The light scattering measurements are performed as a function of scattering angle and of polymer concentration using standard procedures. The differential refractive index (DRI) of the sample is measured at the same wavelength and in the same solvent used for the light scattering. Thus, the reference to molecular weight in reference to final star or radial polymers means molecular weight determined in this fashion. However, even with the star polymers, the endblocks are still measured by taking an aliquot and using GPC as described for the linear polymers.

As used herein, the term "stress relaxation" refers to the percent loss of tension or load between the maximum load or force encountered after elongating an elastic material at a specified rate of extension to a predetermined length (or the load or force measured at some initial length) and the remaining load or force measured after the sample has been held at that length for a specified period of time, for example, from about 0 minutes to about 30 minutes. Stress relaxation is expressed as a percentage loss of the initial load encountered at a specified extension of an elastic material. The stress relaxation is determined by calculating the differences between the initial maximum load measured after elongating an elastic material at a rate of 20 inches per minute to an elongation of 100 percent (i.e., to 100 percent of the material's initial length) and the remaining load measured after that sample was held at that length for 8 hours divided by the initial maximum load at that length. Testing may be performed on an Instron Model 1122 Universal Test Machine using a sample dumbbell (ASTM D1708) attached to jaw faces that have a width of 1 inch and a height of 1 inch at 23° C. and 49° C. (73° F. and 120° F.). Stress relaxation after 8 hours at, for example, an elongation of 100% (i.e., to 100% of the material's initial length—from 100 mm to 200 mm) may be expressed as a percentage utilizing the following equation:

$$\text{stress relaxation}=(\text{initial peak load}_{100\%}-\text{load}_{100\%}@8\text{ hours})/(\text{initial peak load}_{100\%})*100.$$

Thus a low number is good because it indicates a material that is like a rubber band in that it continues to "pull back" after being stretched, with very little difference in pull after about 8 hours.

As used herein, the terms "set" or "percent set" refer to the deformation of an elastic material measured while the material is in a relaxed condition 1 minute after the material was released from a specified elongation, where it has been held for a specified period of time at a set temperature. The percent set is determined by subtracting the original length from the tested length (stretched and relaxed) and dividing by the initial sample gauge length, and then multiplying by 100. Thus, if the original length is 0.5 inches between gauge marks, the elastomer is stretched so the length between the gauge marks is 1.0 inches and the length after stretching and relaxing is 0.6 inches, the set is 20%, i.e. 0.6 minus 0.5 divided by 0.5 times 100. The set may be measured using "dumbbell" shaped specimens mounted on a piece of silicone release paper covering a wooden board. Gauge marks are marked on the specimens using a pen. The samples are elongated and held in place by "push pins" that are pushed through taped ends of the "dog bone" specimen and the release paper and the wooden board. The board with the elongated sample is placed in a forced air oven and held there for the prescribed amount of time.

The ingredients of this elastomeric adhesive composition can be incorporated by any conventional means known in the art, such as melt blending and solution blending. The preferred method of incorporation is melt blending using a conventional sigma blade mixer. Preferably, the elastomeric block copolymer is added to roughly half of the resin and all of the antioxidant. After this mixture is fluxed the remainder of the resin or resins is added and after fluxing the oil is added.

The compositions of this invention have utility in those areas where elastomeric adhesives need superior properties under tension and will be able to hold their configuration even if a fabric such as a disposable garment is stretched.

EXAMPLES

In the following runs 1–8 the formulations were prepared by first heating half of the tackifying resin with the antioxidant and then fluxing with the polymer in a sigma blade mixer. Thereafter the other one half of the resin or resins was added, heating and mixing continued until the mixture fluxed and thereafter the oil was added and heating and mixing continued until the oil was uniformly incorporated into the composition. The formulations were all molded into plaques at 116° C.–160° C. (240–320° F.) and subsequently cut into "dumbbell" shaped specimens as described in ASTM D1708 and tested for percent set at various temperatures and times. In addition, the melt viscosity was determined at 350° F. The desired properties are low set and a workable viscosity preferably about 10,000 to 500,000 cps, more preferably about 10,000 although viscosity is up to 175,000 are acceptable. The results are set out hereinbelow in Table 1.

TABLE I

| Formula | A | B | C | D | E | F | G | H | I | J | K | L |
|---|---|---|---|---|---|---|---|---|---|---|---|---|
| D1114[14] | 25 | | | | | | | | | | | |
| D1111[3] | | 25 | 25 | | | | | | | | | |
| G1650[4] | | | | 25 | | | | | | | | |
| G1654[5] | | | | | 25 | 25 | 12.5 | 25 | 25 | | | |
| G1651[15] | | | | | | | | | | 25 | 25 | 25 |
| TKG 101[13] | | | | | | | 12.5 | | | | | |
| D1125[2] | | | | | | | | | | | | |
| Endex ® 155[9] | | | 5 | | | 5 | | | | | | |
| Petrothene ® NA 601[16] | | | | | | | 10 | 10 | | | 10 | |
| PROflow ® 1000[17] | | | | | | | | | 10 | | | 10 |
| Regalrez ® 1085[6] | 54 | 54 | 49 | 54 | 54 | 49 | 44 | 44 | 44 | 54 | 44 | 44 |
| Tufflo ® 6056[8] | 20 | 20 | 20 | 20 | 20 | 20 | 20 | 20 | 20 | 20 | 20 | 20 |
| Irganox ® 1010[10] | 1 | 1 | 1 | 1 | 1 | 1 | 1 | 1 | 1 | 1 | 1 | 1 |
| Zonatac ® 105[18] | | | | | | | | | | | | |
| % Set 100F, 1 Day | 60 | 20 | 10 | 35 | 0 | 10 | | 20 | 30 | 10 | 20 | |
| % Set 110F, 1 Day | | | | | 5 | | | | 30 | | 20 | |
| % Set 120F, 1 Day | 100 | 65 | 40 | 80 | 10 | 10 | | 20 | 35 | 15 | 30 | |
| % Set 100F, 1 Week | | | 30 | | 10 | 10 | | 30 | 30 | 10 | 20 | |
| % Set 120F, 1 Week | | | 65 | | 10 | 15 | | 25 | 40 | 10 | failed | |
| % Set 100F, 2 Week | | | 40 | | 0 | 5 | | 20 | 35 | 10 | 20 | |
| % Set 120F, 2 Week | | | 85 | | 15 | 15 | | 20 | 40 | 10 | 25 | |
| 350F Visc, cps | 2744 | 5902 | 7059 | 21130 | $>2\times10^6$ | $>2\times10^6$ | | $>2\times10^6$ | | $>2\times10^6$ | $>2\times10^6$ | $>2\times10^6$ |
| Stress Relaxation (% retention after 8 hrs) | | | | | | | | | | | | |
| 74° F. | | 81 | | | | | | | | | | |
| 120° F. | | 20 | | | | | | | | | | |

TABLE I-continued

| Formula | M | N | O | P | Q | R | S | T | U | V | W | X |
|---|---|---|---|---|---|---|---|---|---|---|---|---|
| PP4939[1] | | | | | | 25 | | | | | | |
| D1111[3] | 25 | | | | | | 25 | 25 | | | | |
| G1650[4] | | | | | | | | | | | | 15 |
| G1654[5] | | | | | | | | | 20 | 15 | | 10 |
| G1651[15] | | | | | | | | | | | | |
| TKG 101[13] | | | 25 | 25 | | | | | | | 40 | |
| D1125[2] | | 25 | | | | 25 | | | | | | |
| Endex ® 155[9] | | | | | | 5 | 10 | 5 | | | | |
| Petrothene ® NA 601[16] | | 10 | | | | | | | | | | |
| PROflow ® 1000[17] | | | | | | | | | | | | |
| Regalrez ® 1085[6] | | 54 | 44 | 54 | 54 | 49 | 46.7 | | 57.7 | 61.3 | 43.1 | 54 |
| Tufflo ® 6056[8] | 20 | 20 | 20 | 20 | 20 | 20 | 17.3 | 20 | 21.3 | 22.7 | 15.9 | 20 |
| Irganox ® 1010[10] | 1 | 1 | 1 | 1 | 1 | 1 | 1 | 1 | 1 | 1 | 1 | 1 |
| Zonatac ® 105[18] | 54 | | | | | | | | | | | |
| Escorez ® 5320[7] | | | | | | | | 49 | | | | |
| % Set 100F, 1 Day | 65 | 20 | 60 | 80 | 5 (O)[11] | 20 | 15 | 20 | 0 | 0 | 60 | 20 |
| % Set 110F, 1 Day | | | 65 | 80 | | | | | | | | |
| % Set 120F, 1 Day | 100 | 70 | 95 | 100 | 20 (5) | 55 | 40 | 55 | 0 | 20 | 100 | 55 |
| % Set 100F, 1 Week | | | | | 5 | 35 | 25 | 45 | 0 | 10 | failed[12] | 30 |
| % Set 120F, 1 Week | | | | | 10 | 75 | 60 | 85 | 10 | 15 | 95 | 60 |
| % Set 100F, 2 Week | | | | | | | | | | | | |
| % Set 120F, 2 Week | | | | | | | | | | | | |
| 350F Visc, cps | 3850 | 2357 | 2205 | 1310 | >2 × $10^6$ | 4960 | 10750 | 8200 | >2 × $10^6$ | 149300 | 11160 | 264000 |
| Stress Relaxation (% retention after 8 hrs) | | | | | | | | | | | | |
| 74° F. | | | | | 64 | 90 | 84 | — | — | 81 | — | 86 |
| 120° F. | | | | | — | 42 | 59 | — | — | 60 | — | 37 |

[1]Coupled styrene/isoprene/styrene unhydrogenated polymer having 64 wt % diblock content with a 30,000 molecular weight styrene endblock and a wt % styrene of 22.
[2]Styrene/isoprene/styrene coupled polymer not hydrogenated with a diblock content of 18 wt % having a 14,700 styrene endblock and 30 wt % total styrene.
[3]Styrene/isoprene/styrene coupled polymer not hydrogenated having a 16 wt % diblock content, a styrene endblock of 15,500 and a wt % styrene content of 21.7.
[4]A sequentially polymerized styrene/butadiene/styrene polymer hydrogenated to give SEBS with essentially no diblock content, molecular weight for each endblock of 9,900 and a weight percent styrene content of 29.5.
[5]A sequentially polymerized styrene/butadiene/styrene polymer hydrogenated to give SEBS having essentially no diblock content with 18,600 molecular weight endblocks, and 31 weight percent total styrene.
[6]A tackifying resin produced by the polymerization and hydrogenation of pure hydrocarbon feedstocks having a doftening point of 85° C. and sold by Hercules.
[7]Hydrogenated dicyclopentadiene resin with a 125° C. melting point sold by Exxon.
[8]Predominately paraffinic white mineral oil having an SUS viscosity of 100° F. (ASTM D2161 of 460) sold by Lyondell Lubricants.
[9]A resin derived by copolymerization of pure aromatic monomers having a melting point of 155° C. sold by Hercules.
[10]Tetrakis[methylene(3,5-di-t-butyl-4-hydroxyhydrocinnamate)] methane from Ciba Geigy.
[11]Adhesive slowly retracted back in 5 minutes. A second % set was recorded in ().
[12]By failed, as used herein, is meant the sample broke.
[13]Styrene/ethylene-butylene/styrene with two isoprene arms attached to the center of the molecule. The styrene endblocks are 9300 molecular weight and the molecule is 18 weight percent styrene, 46 weight percent ethylene-butylene and 36 weight percent isoprene.
[14]Styrene/isoprene/styrene unhydrogenated polymer having essentially no diblock, a 11,100 molecular weight endblock and 18.7 weight percent styrene content.
[15]Styrene/ethylene-butylene/styrene hydrogenated polymer having essentially no diblock, 29,000 molecular weight endblock, and 33 weight percent styrene content.
[16]High flow polyethylene (NA 601-00) from Chemical Co.
[17]High flow polypropylene with a melt flow of 2000 from Polyvision Inc.
[18]Styrenated terpene tackifying resin with a softening point of 105° C. from Arizona Chemical Company.

The data in the Table show the following. First it is desirable to have low set, say for instance 70 or less for the 49° C. (120° F.) one day test or 20 or less at 38° C. (100° F.) for 1 day and a low viscosity, preferably around 10,000 but viscosities up to 150,000 to 175,000 are acceptable. Thus, the following is shown:

(1) Styrene/isoprene/styrene block copolymers formulations which have a styrene endblock molecular weight of 14,700 or greater (Run B, C, M, N, Q, R, S, and T) all have better set and stress relaxation properties than formulation A which has an SIS polymer with endblocks which are only 11,400.

(2) Formulation M which has a tackifying resin (ZONATAC® 105) which is partially soluble in the styrene endblock has much poorer set and stress relaxation properties than comparable formulations with tackifying resins which do not plasticize the styrene endblock (Run B, C, R, S, and T).

(3) Formulation B compared with C and S show that endblock resins with a high Tg such as ENDEX® 155 reinforce the styrene domains such that the set and creep properties are significantly improved.

(4) Formulation D when compared with E, F, J, U, V, and X shows that the styrene endblock molecular weight of styrene/ethylene-butylene/styrene polymers should be greater than 10,000 molecular weight to have the best stress relaxation and creep properties.

While this invention has been described in detail for the purpose of illustration, it is not to be construed as limited thereby but is intended to cover all changes and modifications within the spirit and scope thereof.

What is claimed is:

1. An adhesive composition, comprising:

A) a base composition, comprising (i) 15–35 wt % of an unhydrogenated elastomeric block copolyner having a polymerized conjugated diene midblock portion and at least two polymerized monovinyl arene endblock portions, each of said endblock portions having a molecular weight within the range of 13,000 to 30,000, wherein said endblock portions are present at a total concentration within the range of 20 to 24% wt based upon the total weight of said unhydrogenated elastomeric block copolymer; and (ii) 85–65 wt % based on the total weight of (i) and (ii) of tackifying components comprising a midblock compatible resin and oil, said midblock compatible resin and said oil being present in a weight ratio within the range of 1.5:1 to 3.5:1 midblock compatible resin:oil and said midblock compatible resin and said unhydrogenated elastomeric block copolymer being present in a weight ratio of at least 120:100 midblock compatible resin:unhydrogenated elastomeric block copolymer; and B) a stabilizer, said stabilizer being present in an amount within the range of 0.01 to 5 wt % based on the weight of said base composition.

2. The composition according to claim 1, wherein the ingredients of (ii) comprise in addition an endblock compatible resin in an amount within the range of 20–80 parts by weight per 100 parts by weight of said unhydrogenated elastomei block copolymer.

3. A pressure sensitive adhesive composition, comprising:

an unhydrogenated elastomeric block copolymer having a polymerized, conjugated diene midblock portion and two polymerized monovinyl arene endblock portions, each of said endblock portions having a molecular weight within the range of 13,000–30,000, wherein said endblock portions are present at a total concentration within the range of 20 to 24% wt based upon the total weight of said unhydrogenated elastomeric block copolymer;

120–450 parts by weight per 100 parts by weight of said unhydrogenated elastomeric block copolymer of a midblock compatible resin;

40–225 parts by weight per 100 parts by weight of said unhydrogenated elastomeric block copolymer of oil;

20–80 parts by weight per 100 parts by weight of said unhydrogenated elastomeric block copolymer of an endblock compatible resin; and 0.01–5 wt % based on the total weight of said unhydrogenated elastomeric block copolymer, said midblock compatible resin, said oil, and said endblock compatible resin of an antioxidant.

4. The composition according to claim 3, wherein said unhydrogenated elastomeric block copolymer is a coupled styrene/isoprene/styrene linear block copolymer and wherein said endblock portions have a molecular weight within the range of 14,000–20,000, said midblock compatible resin is present in an amount within the range of 150–300 parts by weight per 100 parts by weight of said linear block copolymer, said oil is present in an amount within the range of 45–150 parts by weight per 100 parts by weight of said linear block copolymer, and said antioxidant is present in the amount within the range of 0.5–1 weight percent based on the weight of said linear block copolymer, said midblock compatible resin, said endblock compatible resin, and said oil.

5. The composition according to claim 4, wherein said endblock portions have a molecular weight within the range of 15,000–16,000.

6. The composition according to claim 3, wherein said unhydrogenated elastomeric block copolymer has arm molecular weights of 43,000–106,000.

7. The composition according to claim 6, wherein said midblock compatible resin is an essentially completely hydrogenated polymer made from $C_9$ aromatics, said endblock compatible resin is a resin derived from copolymerization of aromatic monomers, said oil is an essentially completely hydrogenated naphthenic oil, and said antioxidant is a hindered phenol.

8. The composition according to claim 3, wherein said composition is essentially free of any resin which is compatible with both said midblock portion and said endblock portions.

9. An adhesive composition, comprising:

A) a base composition, comprising (i) 12–33 wt % of an elastomeric block copolymer having an ethylene/propylene or ethylene/butylene midblock portion derived from hydrogenated polymerized isoprene or butadiene and at least two polymerized monovinyl arene endblock portions, each of said endblock portions having a molecular weight within the range of 11,000 to 20,000, wherein said endblock portions are present at a total concentration within the range of 20 to 24% wt based upon the total weight of said hydrogenated elastomeric block copolymer, and (ii) 88–67 wt %, based on the total weight of (i) and (ii), of tackifying components comprising a midblock compatible resin and oil, said midblock compatible resin and said oil being present in a weight ratio within the range of 1.5:1 to 3.5:1 midblock compatible resin:oil and said midblock compatible resin and said hydrogenated elastomeric block copolymer being present in a weight ratio of at least 120:100 midblock compatible resin:hydrogenated elastomeric block copolymer, and B) a stabilizer present in an amount within the range of 0.01–5 wt % based on the weight of said base composition.

10. The composition according to claim 9, wherein the ingredients of (i) comprise in addition an endblock compatible resin in an amount within the range of 20–80 parts by weight per 100 parts by weight of said hydrogenated elastomeric block copolymer, and said endblock compatible resin has a Tg of greater than 90° C.

11. An adhesive composition, comprising:

a hydrogenated elastomeric block copolymer having a midblock portion derived from polymerized, conjugated diene and at least two polymerized monovinylarene endblock portions, each of said endblock portions having a molecular weight within the range of 12,000–20,000, wherein said endblock portions are present at a total concentration within the range of 20 to 24% wt based upon the total weight of said hydrogenated elastomeric block copolymer;

140–600 parts by weight of a midblock compatible resin per 100 parts by weight of said hydrogenated elastomeric block copolymer;

50–300 parts by weight of oil per 100 parts by weight of said hydrogenated elastomeric block copolymer;

20–80 parts by weight of an endblock compatible resin per 100 parts by weight of said hydrogenated elastomeric block copolymer; and 0.01–5 wt % of a stabilizer based on the total weight of said hydrogenated elastomeric block copolymer, said midblock compatible resin, and said endblock compatible resin.

12. The composition according to claim 11, wherein said hydrogenated elastomeric block copolymer is derived from a sequentially polymerized styrene-isoprene-styrene or styrene-butadiene-styrene block copolymer, said endblock portions have a molecular weight within the range of 13,000–17,000, said midblock compatible resin is present in an amount within the range of 250–500 parts by weight per 100 parts by weight of said hydrogenated elastomeric block copolymer, said oil is present in an amount within the range of 50–200 parts by weight per 100 parts by weight of said hydrogenated elastomeric block copolymer, said endblock compatible resin is present in the amount from 25–40 parts by weight per 100 parts by weight of said hydrogenated elastomeric block copolymer, and said stabilizer is an antioxidant present in an amount within the range of 0.5–1 wt % based on the total weight of said hydrogenated elastomeric block copolymer, said midblock compatible resin, said oil, and said endblock compatible resin.

13. The composition according to claim 11, wherein said composition is essentially free of any resin which is compatible with both said midblock portion and said endblock portions.

14. The composition according to claim 1, wherein said hydrogenated elastomeric block copolymer has a styrene content within the range of 22 to 24 wt % based on the total weight of said hydrogenated elastomeric block copolymer.

15. The composition according to claim 11, wherein said hydrogenated elastomeric block copolymer has arm molecular weights within the range of 30,000 to 60,000.

16. The composition according to claim 15, wherein said midblock compatible resin is an essentially completely hydrogenated polymer made from copolymerizing $C_9$ aromatics, wherein said endblock compatible resin is a resin derived by copolymerization of aromatic monomers, said oil is an essentially completely hydrogenated napthenic oil, said antioxidant is a hindered phenol.

17. The composition according to claim 16, wherein the Tg of the aromatic endblock resin is greater than 90° C.

18. A process for producing an adhesive formulation, comprising:

selecting an elastomeric block copolymer having a midblock portion derived from polymerized diene and at least two endblocks derived from polymerized monovinyl arene, said selection being based on the molecular weight of the endblock segments;

selecting a first tackifying resin based on a high degree of compatibility with said midblock section and lack of compatibility with said endblock sections;

selecting a second tackifying resin based on a high degree of compatibility with said endblock segments and incompatibility with said midblock segment;

selecting an oil based on compatibility with said midblock segment and incompatibility with said endblock segments; and combining said block copolymer, said first tackifying resin, said second tackifying resin, and said oil, and, in addition, an antioxidant to produce said adhesive composition, wherein said first tackifying resin and said elastomeric block copolymer are combined in a weight ratio of at least 120:100 first tackifying resin:elastomeric block copolymer.

* * * * *